(12) United States Patent
McCullough et al.

(10) Patent No.: US 6,835,347 B2
(45) Date of Patent: Dec. 28, 2004

(54) METHOD OF FORMING A HIGHLY THERMALLY CONDUCTIVE AND HIGH STRENGTH ARTICLE

(75) Inventors: Kevin A. McCullough, N. Kingstown, RI (US); James D. Miller, Marietta, GA (US); E. Mikhail Sagal, Warwick, RI (US)

(73) Assignee: Cool Options, Inc., Warwick, RI (US)

( * ) Notice: Subject to any disclaimer, the term of this patent is extended or adjusted under 35 U.S.C. 154(b) by 51 days.

(21) Appl. No.: 10/605,059

(22) Filed: Sep. 5, 2003

(65) Prior Publication Data

US 2004/0106702 A1 Jun. 3, 2004

Related U.S. Application Data

(63) Continuation of application No. 09/903,347, filed on Jul. 11, 2001.
(60) Provisional application No. 60/218,090, filed on Jul. 13, 2000.

(51) Int. Cl.$^7$ .............................. H05B 6/00; C08K 3/04; C08K 3/10; C08K 3/22
(52) U.S. Cl. ....................... 264/478; 264/454; 524/404; 524/430; 524/439; 524/440; 524/441; 524/496
(58) Field of Search .............................. 524/496, 404, 524/430, 439, 440, 441; 264/105, 454, 478

(56) References Cited

U.S. PATENT DOCUMENTS

| | | | |
|---|---|---|---|
| 3,398,233 A | 8/1968 | Lizasoain et al. | |
| 3,673,121 A | 6/1972 | Meyer | 252/511 |
| 3,708,387 A | 1/1973 | Turner et al. | |
| 4,098,945 A | 7/1978 | Oehmke | 428/327 |
| 4,307,147 A | 12/1981 | Ohishi et al. | 428/268 |
| 4,367,745 A | 1/1983 | Welage | 128/303.13 |
| 4,496,475 A | 1/1985 | Abrams | 252/514 |
| 4,568,592 A | 2/1986 | Kawaguchi et al. | 428/107 |
| 4,664,971 A | 5/1987 | Soens | 428/288 |
| 4,689,250 A | 8/1987 | Quella et al. | 427/216 |
| 4,816,184 A | 3/1989 | Fukuda et al. | 252/511 |
| 5,011,870 A | 4/1991 | Peterson | 523/220 |
| 5,011,872 A | 4/1991 | Latham et al. | 523/440 |
| 5,021,494 A | 6/1991 | Toya | 524/404 |
| 5,037,590 A | 8/1991 | Fukushima | 264/29.2 |
| 5,098,610 A | 3/1992 | Okamura et al. | 252/511 |
| 5,098,611 A | 3/1992 | Honda et al. | 252/518 |
| 5,106,540 A | 4/1992 | Barma et al. | 252/511 |
| 5,171,774 A | 12/1992 | Ueno et al. | 524/495 |
| 5,180,513 A | 1/1993 | Durand | 252/62.55 |
| 5,183,594 A | 2/1993 | Yoshinaka et al. | 252/518 |
| 5,213,715 A | 5/1993 | Patterson et al. | 252/518 |
| 5,225,110 A | 7/1993 | Kathirgamanathan | 252/512 |
| 5,286,416 A | 2/1994 | Teichmann et al. | 252/512 |
| 5,302,456 A | 4/1994 | Matsui | 428/407 |
| 5,334,330 A | 8/1994 | Rowlette | 252/512 |
| 5,373,046 A | 12/1994 | Okamura et al. | 524/413 |
| 5,397,608 A | 3/1995 | Soens | 428/34.5 |
| 5,445,308 A | 8/1995 | Nelson et al. | 228/121 |
| 5,490,319 A | 2/1996 | Nakamura et al. | 29/596 |
| 5,522,962 A | 6/1996 | Koskenmaki et al. | 156/272.4 |
| 5,536,568 A | 7/1996 | Teruo | 428/327 |
| 5,552,214 A | 9/1996 | Kobomura et al. | 428/294 |
| 5,580,493 A | 12/1996 | Chu et al. | 252/511 |
| 5,669,381 A | 9/1997 | Hyatt | 428/402 |
| 5,681,883 A | 10/1997 | Hill et al. | 524/404 |
| 5,770,305 A | 6/1998 | Terasaka | 428/328 |
| 5,834,337 A | 11/1998 | Unger et al. | 438/122 |
| 5,851,644 A | 12/1998 | McArdle et al. | 428/213 |
| 5,863,467 A | 1/1999 | Mariner et al. | 252/511 |
| 5,945,217 A | 8/1999 | Hanrahan | 428/389 |
| 6,048,919 A | 4/2000 | McCullough | 524/404 |
| 6,251,978 B1 | 6/2001 | McCullough | 524/404 |
| 6,303,096 B1 | 10/2001 | Yamamoto et al. | 423/447.2 |
| 2002/0022686 A1 | 2/2002 | Itoh et al. | 524/504 |
| 2002/0025998 A1 | 2/2002 | McCullough | 524/66 |

*Primary Examiner*—Tae H. Yoon
(74) *Attorney, Agent, or Firm*—Barlow, Josephs & Holmes, Ltd.

(57) ABSTRACT

A highly thermally conductive and high strength net-shape moldable molding composition, with a thermal conductivity above 4 W/m° K and a strength of at least 15 ksi includes a polymer base matrix of, by volume, between 30 and 70 percent. A first highly thermally conductive filler of high modulus PITCH-based carbon, by volume, between 15 and 47 percent is provided in the composition that has a relatively high aspect ratio of at least 10:1. Also in the composition mixture is a second high strength filler of PAN-based carbon, by volume, between 10 and 35 percent that has a relatively high aspect ratio of 10:1 or more. Optionally, a third filler material of thermally conductive material with a relatively low aspect ratio of 5:1 or less may be included in the composition, by volume less than 10 percent, to improve the thermal conductivity and strength of the composition.

11 Claims, 3 Drawing Sheets

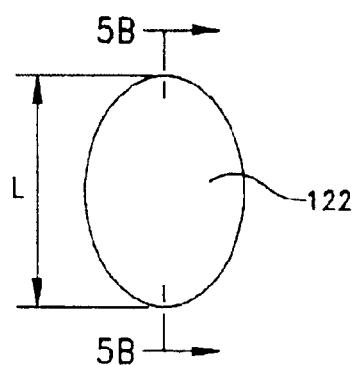
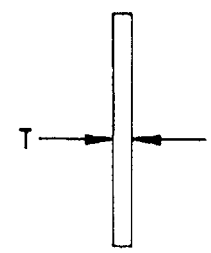
FIG. 5A  FIG. 5B
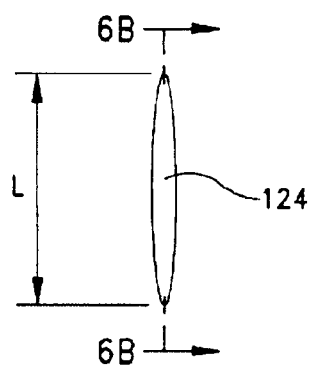
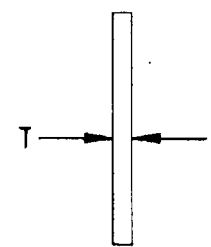
FIG. 6A  FIG. 6B
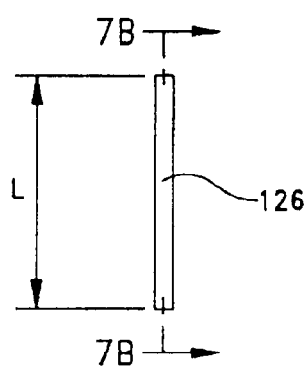
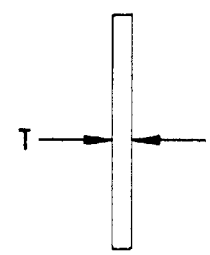
FIG. 7A  FIG. 7B

METHOD OF FORMING A HIGHLY THERMALLY CONDUCTIVE AND HIGH STRENGTH ARTICLE

CROSS REFERENCE TO RELATED APPLICATIONS

This application is a continuation of U.S. Ser. No. 09/903,347, filed on Jul. 11, 2001.

BACKGROUND OF INVENTION

The present invention relates generally to an improved composite material. More specifically, the present invention relates to a highly thermally conductive and very high strength composite material that is net-shape moldable and easily moldable or castable by methods such as injection molding.

In the heat sink industries, it has been well known to employ metallic materials for thermal conductivity applications, such as heat dissipation for cooling semiconductor device packages. For these applications, such as thermally conductive heat sinks, the metallic material typically is tooled or machined from bulk metals into the desired configuration. However, such metallic conductive articles are typically very heavy, costly to machine and are susceptible to corrosion. Further, the geometries of machined metallic heat dissipating articles are very limited to the inherent limitations associated with the machining or tooling process. As a result, the requirement of use of metallic materials which are machined into the desired form, place severe limitations on heat sink design particular when it is known that certain geometries, simply by virtue of their design, would realize better efficiency but are not attainable due to the limitations in machining metallic articles. In addition, members that are subject to high stress suffer from the same disadvantages in that they are also difficult to form into the desired configuration while maintaining the desired high strength.

It is widely known in the prior art that improving the over-all geometry of a heat dissipating article can greatly enhance the overall performance of the article even if the material is the same. Similarly, a well designed configuration of an member can greatly improve the strength of the member and reduce its stress and tendency to fracture. Therefore, the need for improved article geometries necessitated an alternative to the machining of bulk metallic materials to provide thermal and electrical transfer. To meet this need, attempts have been made in the prior art to provide molded compositions that include conductive filler and high strength material therein to provide the necessary thermal conductivity and improve structural integrity. The ability to mold a conductive composite enables the design of more complex part geometries to realize improved thermal performance and superior structural integrity of the part.

Prior art compositions are inadequate to address the needs of high thermal conductivity and high structural integrity in the same composition. Typically, a composition must sacrifice structural integrity in favor of higher thermal conductivity or sacrifice thermal conductivity in favor of structural integrity. However, many applications require that a component have both the characteristics of high thermal conductivity and high structural integrity.

The attempts in the prior art included the employment of a polymer base matrix loaded with a granular material, such as boron nitride grains. Also, attempts have been made to provide a polymer base matrix loaded with flake-like filler material. These fillers improve the thermal conductivity of a molded part. These attempts are, indeed, moldable into complex geometries but still do not approach the desired performance levels found in metallic machined parts. In addition, known conductive plastic materials are undesirable because they are typically very expensive to manufacture because they employ very expensive filler materials. Still further, these conductive composite materials must be molded with extreme precision due to concerns of filler alignment during the molding process. Even with precision molding and design, inherent problems of fluid turbulence, collisions with the mold due to complex product geometries make it impossible to position the filler ideally thus causing the composition to perform far less than desirable. Even assuming the proper filler is selected and aligned properly and thermal conductivity is improved, it is common for such a material to have poor structural integrity due to the materials used. For example, high modulus PITCH-based carbon fiber is typically used as a filler to improve thermal conductivity but such a filler is very brittle and is not typically a suitable filler for improving the structural integrity of the composition.

Moreover, the entire matrix of the composition must be satisfactory because heat transfer is a bulk property rather than a direct path property such as the transfer of electricity. Heat is transferred in bulk where the entire volume of the body is employed for the transfer while a direct path is needed to conduct electricity. Therefore, even if a highly conductive narrow conduit is provided through a much lower conductive body, the heat transfer would not be as good as a body which is consistently marginally conductive throughout the entire body. Therefore, consistency of the thermal conductivity of the entire matrix of the composite body is essential for overall high thermal conductivity. Similarly, a consistently strong matrix of composite material is highly desirable to improve the overall structural integrity of the finished molded composite part.

In view of the foregoing, there is a demand for a composite material that is highly thermally conductive and of high structural integrity. In addition, there is a demand for a composite material that can be molded or cast into complex product geometries to enhance thermal conductivity and structural integrity. There is also a demand for such a moldable article that exhibits thermal conductivity and structural integrity as close as possible to or in excess of purely metallic conductive materials while being lightweight and relatively low in cost to manufacture.

SUMMARY OF INVENTION

The present invention preserves the advantages of prior art thermally conductive and structurally enhanced plastic compositions. In addition, it provides new advantages not found in currently available compositions and overcomes many disadvantages of such currently available compositions.

The invention is generally directed to the novel and unique highly thermally conductive plastic composite material with particular application in heat sink applications where heat must be moved from one region to another to avoid device failure. According the application at hand, the highly thermally conductive part made from the composition of the present invention may also be required to exhibit high structural integrity as well. For example, an outer case for a mobile phone requires high structural integrity to prevent damage to the delicate electrical component parts housed therein. However, the outer case may also be needed to help dissipate heat generated by the same component parts.

The composite material of the present invention enables a highly thermally and high structural integrity composite material to be manufactured at relatively low cost to meet both needs at the same time in a single composite material. The conductive molding composition of the present invention has a thermal conductivity of approximately 4 W/m° K or more and a tensile strength of at least approximately 15 ksi and a flexural strength of at least approximately 20 ksi and a flexural modulus of at least approximately 2 Msi.

The conductive composition of the present invention includes a polymer base matrix of, by volume, between 30 and 70 percent. The base matrix is preferably polycarbonate material but may also be liquid crystal polymer material. A first thermally conductive filler of high modulus PITCH-based carbon material, by volume, between 15 and 47 percent is provided in the composition that has a relatively high aspect ratio of at least 10:1. A second filler of PAN-based carbon filler is also provided to greatly improve the strength of the composition and is provided, by volume, between 10 and 35 percent and also has a high aspect ratio of at least 10:1. The total fiber content of the composition is preferably in the range of 30 to 70 percent by volume. The ratio of the high modulus PITCH-based carbon fiber to the PAN-based carbon fiber is preferably in the range of about 1:1 to 2:1. Optionally, the mixture also includes a third filler to improve the thermal conductivity of the composition which is provided, by volume, between 1 and 10 percent that has a relatively low aspect ratio of 5:1 or less.

During the molding process of the composition of the present invention, the mixture is introduced into a mold cavity and flows into the various part geometries. The high aspect ratio first filler and high aspect ratio second filler generally align with the flow of the mixture in the mold. The third filler, of a low aspect ratio, may be optionally added in the mixture to fill the voids between the first and second high aspect ratio fillers in the mixture. As a result, the number of interfaces and base matrix thickness between filler members is greatly reduced thus resulting in thermal conductivity and performance superior to that found in prior art conductive composite materials while still providing a high strength molding composition.

It is therefore an object of the present invention to provide a highly thermally conductive composite material that also has high structural integrity.

It is an object of the present invention to provide a highly thermally conductive composite material of high structural integrity that is moldable, such as by injection molding.

It is a further object of the present invention to provide a low cost conductive composite material.

Another object of the present invention is to provide a conductive composite material that enables the molding of complex part geometries to enhance thermal conductivity and structural integrity.

It is a further object of the present invention to provide a highly thermally conductive composite material of high structural integrity that is significantly lighter in weight than metallic materials.

It is yet a further object of the present invention to provide a highly thermally conductive composite material of high structural integrity that has a thermal and strength close to pure or composite metallic materials.

BRIEF DESCRIPTION OF DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 5A is a top view of a high aspect ratio filler member of a flake-like configuration;

FIG. 5B is a cross-sectional view through the line 5B-5B of FIG. 5A;

FIG. 6A is a top view of a high aspect ratio filler member of a rice-like configuration FIG. 6B is a cross-sectional view through the line 6B-6B of FIG. 6A;

FIG. 7A is a top view of a high aspect ratio filler member of a strand-like configuration;

FIG. 7B is a cross-sectional view through the line 7B-7B of FIG. 7A;

DETAILED DESCRIPTION

Figure 1:
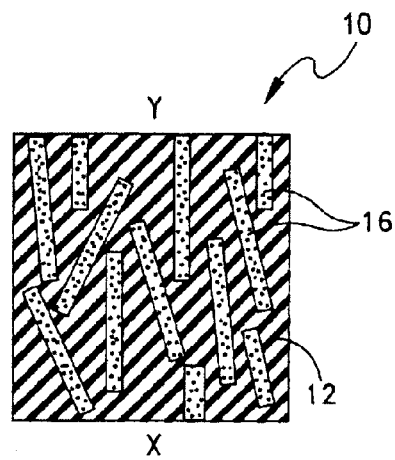
FIG. 1 is a cross-sectional view of a prior art conductive composite material employing a high modulus PITCH-based carbon material in a base matrix.
Figure 2:
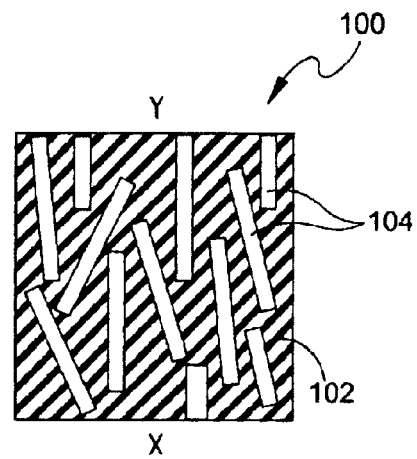
FIG. 2 is a cross-sectional view of a prior art conductive composite material employing a PAN-based carbon material in a base matrix.
Figure 4:
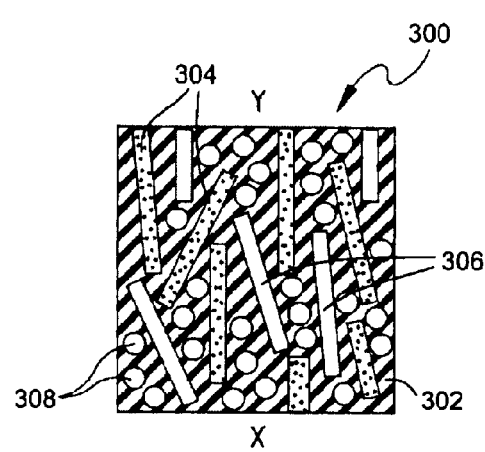
FIG. 4 is a cross-sectional view of the thermally conductive and high strength composite material of the present invention employing a high modulus PITCH-based carbon material, PAN-based carbon material and low aspect ratio filler in a polymer base matrix.

Referring first to FIGS. 1–2, various prior art composite materials 10 and 100, which are readily commercially available, are shown. In particular, FIG. 1, shows a base matrix 12 of, for example, polycarbonate material. Loaded within the polymer base 12 are high modulus PITCH-based carbon fibers 16 loaded therein. It is well know that high modulus PITCH-based carbon fiber is highly thermally conductive, capable of thermal conductivities on the order of 800 W/m° K. As a result, the prior art composition 10 shown in FIG. 4 is highly thermally conductive while still being injection moldable into a net shape. However, high modulus PITCH-based carbon fiber is extremely brittle which results in a composition that is very weak is delicate making it unsuitable for high strength applications. The prior art composition 10 is shown in enlarged detail for clarity and ease of illustration.

Also, FIG. 2 shows another prior art composition 100 having a base matrix 102 of, for example, polycarbonate material. Loaded within the polymer base 102 are PAN-based carbon fibers 104 loaded therein. It is well know that PAN-based carbon fiber is very strong and suitable for high strength applications and exhibits a tensile strength over 30 ksi but is known to exhibit very low thermal conductivities, often well below 10 W/m° K. As a result, the prior art composition 100 shown in FIG. 2 is itself very strong and suitable for high strength applications but exhibits and overall thermally conductivity which is very low, such as in the range of about 1 W/m° K. Therefore, the prior art composition 100 is not suitable for heat transfer applications. The prior art composition 100 is shown in enlarged detail for clarity and ease of illustration.

Figure 3:
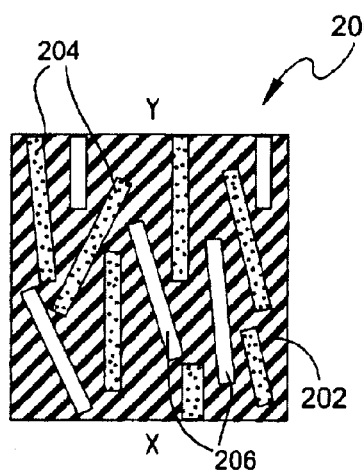
FIG. 3 is a cross-sectional view of the thermally conductive and high strength composite material of the present invention employing a high modulus PITCH-based carbon material and PAN-based carbon material in a polymer base matrix.

Turning now to FIG. 3, the inventive composition 200 of the present invention is shown. In accordance with the present invention, the loading of thermally conductive filler and high strength filler in a polymer base matrix renders the material thermally conductive and high in strength while permitting the material to be net-shape moldable.

Specifically, the composition 200 of the present invention includes a base matrix 202 of a moldable polymer material, such as polycarbonate or liquid crystal polymer. Polycarbonate is a preferred base matrix material. The base matrix is filled with highly thermally conductive, high aspect ratio high modulus PITCH-based carbon fiber 204 as well as high strength, high aspect ratio PAN-based carbon fiber 206. It is preferred that the composition 200 of the present invention have a polymer base matrix of, by volume, between 30 and 70 percent. The base matrix is preferably polycarbonate material but may also be liquid crystal polymer material. A first thermally conductive filler of high modulus PITCH-based carbon material, by volume, between 15 and 47 percent is provided in the composition that has a relatively high aspect ratio of at least about 10:1. A second filler of PAN-based carbon filler is also provided to greatly improve the strength of the composition and is provided, by volume, between 10 and 35 percent and also has a high aspect ratio of at least about 10:1. The total fiber content of the composition is preferably in the range of 30 to 70 percent by volume. The ratio of the high modulus PITCH-based carbon fiber to the PAN-based carbon fiber is preferably in the range of about 1:1 to 2:1. Optionally, the mixture also includes a third filler to improve the thermal conductivity of the composition which is provided, by volume, between 1 and 10 percent that has a relatively low aspect ratio of about 5:1 or less. The carbon fibers preferably have an aspect ratio exceeding about 50:1. With the foregoing disclosed ranges, high volume loading and proper wet-out can be achieved.

Below is an example of the preferred embodiment of the present invention.

EXAMPLE

A base matrix of polycarbonate material is provided as 50 percent (by volume) of the composition mixture. High aspect ratio high modulus PITCH-based carbon flakes, with an aspect ratio of approximately 50:1 and independent thermal conductivity of approximately 800 W/m° K are provided as approximately 30 percent (by volume) of the composition mixture. High aspect ratio high strength PAN-based carbon flakes, with an aspect ratio of approximately 50:1 are provided as approximately 20 percent (by volume) of the composition mixture. The composition has a thermal conductivity of approximately 4 W/m° K. Also, the composition exhibits a tensile strength of approximately 22.5 ksi, a flexural strength of approximately 35 ksi and a flexural modulus of approximately 4.5 Msi.

The following chart compares the composition 200 to the prior art compositions 10 and 100 of FIG. 1 and FIG. 2, respectively.

Thermal Conductivity - Tensile Strength Compared to Prior Art

|  | Base Polymer (by volume) | First High Aspect Ratio Filler (by volume) | Second High Aspect Ratio Filler (by volume) | Thermal Conductivity (W/m° K.) | Tensile Strength (ksi) |
| --- | --- | --- | --- | --- | --- |
| Prior Art (FIG. 1) | 50% Polycarbonate | 50% Carbon Fiber (high modulus PITCH-based) Random Lengths Min 50:1 Aspect Ratio | N/A | 10 | 10 |
| Prior Art (FIG. 2) | 50% Polycarbonate | N/A | 50% Carbon Fiber (PAN-based) Random Lengths Min 50:1 Aspect Ratio | 1 | 25 |
| Present Invention (FIG. 3) | 50% Polycarbonate | 30% Carbon Fiber (high modulus PITCH-based) | 20% Carbon Fiber (PAN-based) Random Lengths | 4 | 15 |

-continued

Thermal Conductivity - Tensile Strength Compared to Prior Art

| Base Polymer (by volume) | First High Aspect Ratio Filler (by volume) | Second High Aspect Ratio Filler (by volume) | Thermal Conductivity (W/m° K.) | Tensile Strength (ksi) |
| --- | --- | --- | --- | --- |
| | Random Lengths Min 50:1 Aspect Ratio | Min 50:1 Aspect Ratio | | |

When employed as a thermal conductor, the composition 200 must thermally transfer heat from, for example, side X to side Y of the material. During this transfer, heat must travel from heat conductive filler member to the adjacent heat conductive filler member to travel the path from X to Y. Since the high modulus PITCH-based carbon fibers 204 are much more thermally conductive than the PAN-based carbon fibers 206, the majority of the thermal transfer will occur through the high modulus PITCH-based carbon fibers.

It is known in the art that having too many interfaces and too much polymer between the two points of travel of heat will have a deleterious effect on the overall thermal conductivity and structural integrity of the molded part. In an ideal composition, high aspect ratio filler aligns perfectly within the composition to reduce the number of interfaces heat and electricity must cross and the volume of base matrix the heat must travel through. In this ideal composition, the number of interfaces encountered, when going from point X to Y, are significantly reduced.

However, the ideal filled molded composition is virtually impossible to achieve in the field. This is primary due to geometry of the part to be molded. As stated earlier, one of the primary reasons for employing a thermally and high strength conductive plastic composition is that it is moldable into more complex geometries to achieve better heat dissipation and electrical transmission. Therefore, intricate part geometries are typically encountered when molding conductive polymer materials.

With these intricate geometries, turbulence of the flow of the filler loaded matrix is common resulting in collisions of the filler material and non-uniform alignment. While parallel alignment of the high aspect ratio filler is obviously preferred, it cannot be attained. Further, the turbulence of flow and collisions with edges of the mold often breaks the high aspect ratio filler particularly when it has an aspect ratio larger than 20:1 and breakage of the high aspect ratio filler 16 will cause the conductivity of the composition to degrade as well.

Heat must cross many interfaces between several filler members as well as the non-conductive polymer residing therebetween. The more interfaces that heat must cross and the more polymer the heat must pass through, the more degraded the thermal conductivity will be. Further, too much loading of filler material would prevent the base polymer from wetting out resulting in undesirable small air pockets in the finished molded product. Similarly, the structural integrity is enhanced through the reduction of voids within the base matrix to provide a more consistent molded product resulting in a stronger composition suitable for high strength applications.

Turning now to FIG. 4, the alternative embodiment 300 of the composition of the present invention addresses the aforementioned problems with the presence of voids in the molding composition by the addition of a third filler material. Composition 300 includes a base matrix 302 which is preferably polycarbonate material buy may be liquid crystal polymer material. Loaded into the base matrix 302 are high modulus PITCH-based high aspect ratio carbon fiber filler 304 and PAN-based high aspect ratio carbon fiber filler 306. This embodiment 300 of present invention further employs low aspect ratio highly thermally conductive filler material 308. The use of the low aspect ratio filler 308 address the problem with imperfect parallel alignment of the high aspect ratio fillers 304 and 306 within the composition 300. The low aspect filler 308 to fills the voids naturally left between adjacent high aspect ratio fillers 304 and 306 due to turbulence during molding and complex mold geometries. As a result of the employment of both low aspect ratio filler 308 and high aspect ratio fillers 304 and 306 within the same composition 300, the overall number of transitions surfaces can be greatly reduced while replacing the voids with low aspect ratio filler 308 which were previously filled with non-conductive polymer 302.

The low aspect ratio filler 308 used in the alternative embodiment of FIG. 4 typically has a length to width ratio less than about 5:1. Such low aspect ratio filler 308 fills the voids as described above to improve the overall thermal conductivity of the composition while still providing a very high strength moldable composition 300. For example, the mixture may include, by volume, 1–10 percent low aspect ratio filler 308 in the composition 300. The low aspect ratio filler 308 is preferably a metallic material or boron nitride which has an independent thermal conductivity of on the order of approximately 400 W/m° K.

The present invention, as shown in FIGS. 3 and 4, preferably includes a polycarbonate material as the base matrices 202 and 302. Alternatively, the base matrices may be liquid crystal polymer. Liquid crystal polymer may be preferred in certain circumstances due to its highly crystalline nature and its natural tendency to align the filler loaded therein. Various other types of polymers can be employed. Further, the base matrix may be of metallic material if die casting of the conductive body is required for the application. For example, the base matrix may be copper, or other metals, to enhance electrical conductivity.

In the preferred embodiment of FIG. 3 and the alternative embodiment of FIG. 4, the high aspect ratio fillers 204, 206 and 304, 306 are preferably in a fiber configuration having a length to width aspect ratio of at least 50:1. FIGS. 5–8 illustrate various different configurations in which the high aspect ratio fillers 204, 206 and 304, 306 may be employed and still be within the scope of the present invention.

Figure 8:
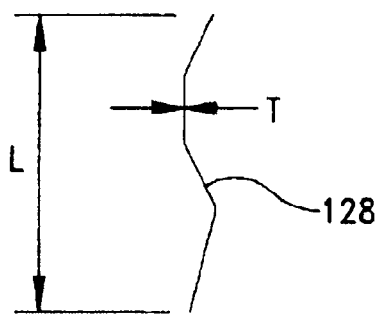
FIG. 8 is a top view of a high aspect ratio filler member of a whisker-like configuration.

As shown in FIGS. 5A and 5B, high aspect ratio fillers 204, 206 and 304, 306 is may be of a flake-like or plate-like configuration 122 with a length L and thickness T. FIGS. 6A and 6B illustrate another configuration which is shown to be in a rice-like configuration 124 with length L and thickness T. FIGS. 7A and 7B shown a strand-like configuration 126 with a length L and thickness T. FIG. 8 shows a whisker configuration 128 with length L and thickness T. For example, it is preferred that the high aspect ratio fillers 204, 304 be high modulus PITCH-based carbon flakes that are 2/1000 to 4/1000 of an inch thick while being 40/1000 of an inch long to realize a minimum aspect ratio of approximately 10:1. The PAN-based filler 206, 306 is of a similar configuration. The aspect ratio for all high aspect ratio fillers 204, 206 and 304, 306 may be preferably up to about 50:1. While such dimensions are preferred, other sizes of high aspect ratio filler may be employed depending on the application at hand. Alternatively, carbon fiber that is 200 microns in diameter may also be employed.

In each of these configurations shown in FIGS. 5–8, which are suitable for employment in the present invention, the aspect ratio of length L to thickness T is at least about 10:1. Further, the material employed for the high aspect ratio fillers 204, 206 and 304, 306 may be aluminum, alumina, copper, magnesium, brass and carbon. However, high modulus PITCH-based carbon fiber is preferred for the fillers 204 and 304 while PAN-based carbon fiber is preferred for the fillers 206 and 306. Moreover, in an application requiring mostly high thermal transfer properties, the particular high aspect ratio fillers may be specifically selected to enhance thermal conductivity with no concern as to the affect on structural integrity. Similarly, in an application requiring only more high strength properties, the fillers may be selected with less regard to the thermal conductivity of the filler. Of course, the fillers are preferably selected that are both highly thermally conductive and of high strength to provide a composition that is both highly thermally conductive and of high structural integrity.

Figure 9:
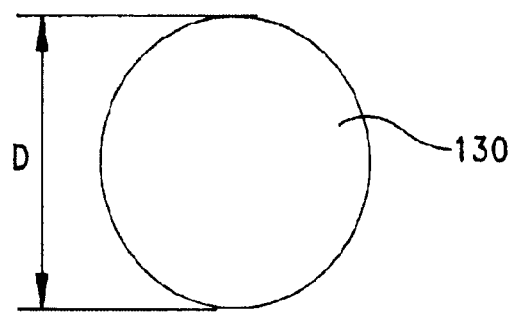
FIG. 9 is a top view of a low aspect ratio spheroid filler member.
Figure 10:
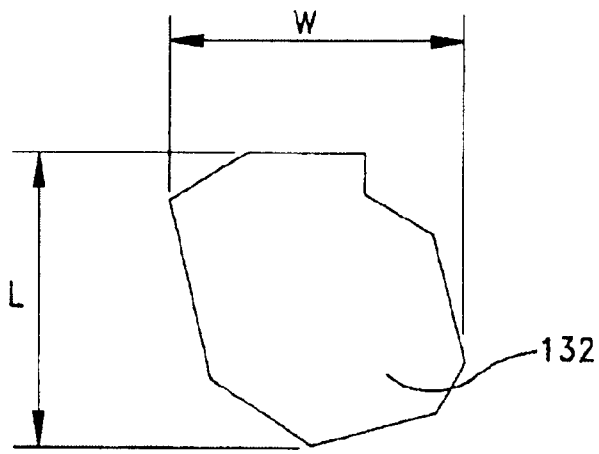
FIG. 10 is a top view of a low aspect ratio grain filler member.

In FIG. 4, a low aspect ratio filler 308 is employed to fill voids within the composition 300. FIGS. 9 and 10 illustrate two examples of suitable low aspect ratio configurations for filler 308. FIG. 9 shows a substantially spheroid filler configuration 130 where the diameter of the member is D. As a result, the aspect of this filler configuration is approximately 1:1. In addition, FIG. 10 illustrates a grain-like or granular filler configuration 132 to serve as the low aspect ratio filler 308. This granular configuration 132 is somewhat random in shape and may have height H to width W ratio of 2:1, or the like. The low aspect ratio filler 308, in accordance with the present invention, is of a ratio of about 5:1 or less. Further, the material employed for the low aspect ratio filler 308 may be aluminum, alumina, copper, magnesium, brass and carbon. The low aspect ratio filler is preferably approximately 10/1000 of an inch in diameter or along its width but may be of different sizes depending on the application at hand. As with the high aspect ratio filler, the low aspect ratio filler may be selected to enhance thermal or the structural integrity of the composition 300. Further, the low aspect ratio material 308 may be selected that has both thermal and high strength properties depending on the application.

In view of the foregoing, a superior moldable highly thermally and high strength composite material can be realized. The composition of the present invention, greatly improves over prior art attempts to provide such a moldable conductive material to enable the manufacture of net-shape moldable articles. In particular, the present invention, provides a highly thermally conductive composition that is vastly improved over known compositions because it is also of high structural integrity and permits the molding of complex part geometries to achieve more efficient heat sink and high strength devices.

It would be appreciated by those skilled in the art that various changes and modifications can be made to the illustrated embodiments without departing from the spirit of the present invention. All such modifications and changes are intended to be covered by the appended claims.

What is claimed is:

1. A method of forming a high thermally conductive and high strength article, comprising the steps of:
    providing a polymer base matrix of, by volume, between approximately 30 and 70 percent;
    providing a first filler of high modulus PITCH-based carbon material, by volume, between approximately 15 and 47 percent; the first filler having an aspect ratio of at least 10:1;
    providing a second filler of polyacrylonitrile based carbon material, by volume, between approximately 10 and 35 percent, the second filler having an aspect ratio of at least 10:1;
    mixing the polymer base matrix, the first filer and the second filler together into a molding composition; and
    net-shape injection molding the molding composition into an article having a thermal conductivity of at least 4 W/m° K and a tensile strength of at least 15 ksi.

2. The method of claim 1, further comprising the step of:
    providing a third filler of thermally conductive material, by volume, between 1 and 10 percent, said third filler having an aspect ratio of less than 5:1; and
    mixing the third filler with the polymer base matrix, the first filler and the second filler into the molding composition.

3. The method of claim 1, wherein said polymer base matrix is a polycarbonate material.

4. The method of claim 1, wherein said polymer bass matrix is a liquid crystal polymer material.

5. The method of claim 1, wherein said first filler is of a fiber configuration.

6. The method of claim 1, wherein said second filler is of a fiber configuration.

7. The method of claim 1, wherein said first filler is of a flake configuration.

8. The method of claim 1, wherein said second filler is of a flake configuration.

9. The method of claim 2, wherein said third filler is spheroid in shape.

10. The method of claim 2, wherein said third filler is of a grain configuration.

11. The method of claim 2, wherein said third filler is selected from the group consisting of boron nitride, aluminum, alumina, copper, magnesium and brass.

* * * * *